(12) United States Patent
De France et al.

(10) Patent No.: US 10,944,227 B2
(45) Date of Patent: Mar. 9, 2021

(54) METHOD OF FORMING AN ELECTRICAL CONNECTOR

(71) Applicant: Hubbell Incorporated, Shelton, CT (US)

(72) Inventors: Robert Victor De France, Poughkeepsie, NY (US); Daniel David Dobrinski, Hillsboro, NH (US)

(73) Assignee: Hubbell Incorporated, Shelton, CT (US)

( * ) Notice: Subject to any disclaimer, the term of this patent is extended or adjusted under 35 U.S.C. 154(b) by 767 days.

(21) Appl. No.: 15/191,030

(22) Filed: Jun. 23, 2016

(65) Prior Publication Data
US 2016/0301174 A1 Oct. 13, 2016

Related U.S. Application Data

(62) Division of application No. 14/052,197, filed on Oct. 11, 2013, now Pat. No. 9,397,461.

(Continued)

(51) Int. Cl.
*H01R 43/04* (2006.01)
*H01R 43/048* (2006.01)
(Continued)

(52) U.S. Cl.
CPC ......... *H01R 43/0484* (2013.01); *H01R 4/183* (2013.01); *H01R 4/20* (2013.01);
(Continued)

(58) Field of Classification Search
CPC .. H01R 43/0484; H01R 43/048; H01R 4/183; H01R 4/20; H01R 11/12; Y10T 29/49181
(Continued)

(56) References Cited

U.S. PATENT DOCUMENTS 2,535,013 A * 12/1950 Freedom .................. H01R 4/20
439/877
3,517,539 A 6/1970 Chrico
(Continued)

FOREIGN PATENT DOCUMENTS

CN 101268595 A 9/2008
WO WO-2013014955 A1 * 1/2013 ........... H01R 43/048

OTHER PUBLICATIONS

Japanese Office Action dated Jun. 13, 2017 which issued in corresponding Patent Application No. 201480022651.9, including English translation.

(Continued)

*Primary Examiner* — Peter Dungba Vo
*Assistant Examiner* — Azm A Parvez
(74) *Attorney, Agent, or Firm* — Dickinson Wright PLLC

(57) ABSTRACT

An electrical connector for a composite core conductor and a method of controlling crimping thereof includes a coupling portion and a tubular portion extending from the coupling portion. A conductor has a non-metallic core surrounded by electrically conductive strands and has a connecting portion of the core extending axially beyond the strands. The connecting portion is received in the tubular portion. A crimped portion on the tubular portion radially engages the connecting portion and secures the conductor to the tubular portion. The crimped portion is formed by concave surfaces on internal surfaces of crimping dies. The concave surfaces have different radii of curvature than remaining portions of the internal surfaces.

21 Claims, 10 Drawing Sheets

Related U.S. Application Data

(60) Provisional application No. 61/800,255, filed on Mar. 15, 2013.

(51) Int. Cl.
  *H01R 4/18* (2006.01)
  *H01R 4/20* (2006.01)
  *H01R 11/12* (2006.01)

(52) U.S. Cl.
  CPC ........... *H01R 11/12* (2013.01); *H01R 43/048* (2013.01); *Y10T 29/49181* (2015.01)

(58) Field of Classification Search
  USPC .......................................................... 29/861
  See application file for complete search history.

(56) References Cited

U.S. PATENT DOCUMENTS

| | | | |
|---|---|---|---|
| 3,575,036 A * | 4/1971 | Hoffman | H01R 43/042 |
| | | | 72/402 |
| 4,053,249 A | 10/1977 | Ness | |
| 4,696,298 A | 9/1987 | Higgins et al. | |
| 4,828,516 A * | 5/1989 | Shaffer | H01R 43/058 |
| | | | 29/863 |
| 5,058,272 A | 10/1991 | Steube | |
| 5,217,392 A | 6/1993 | Hosler | |
| 5,692,294 A * | 12/1997 | Casey | B25B 27/146 |
| | | | 29/751 |
| 5,907,901 A * | 6/1999 | Hogan, Jr. | H01R 43/048 |
| | | | 29/33 M |
| 6,101,862 A | 8/2000 | Rzasa | |
| 6,227,030 B1 | 5/2001 | Lefavour | |
| 6,382,318 B1 | 5/2002 | Whitlock | |
| 6,747,211 B2 | 6/2004 | Connor | |
| 6,769,173 B2 | 8/2004 | Chadbourne | |
| 6,805,596 B2 | 10/2004 | Quesnel | |
| 7,385,138 B2 | 6/2008 | De France | |
| 8,167,665 B2 | 5/2012 | De France | |
| 9,397,461 B2 * | 7/2016 | De France | H01R 43/0484 |
| 2005/0281512 A1 * | 12/2005 | Lutzen | G02B 6/3887 |
| | | | 385/87 |
| 2006/0084327 A1 | 4/2006 | Chadbourne | |
| 2007/0062718 A1 * | 3/2007 | De France | H02G 15/18 |
| | | | 174/84 C |
| 2007/0161299 A1 | 7/2007 | Chen | |
| 2008/0072991 A1 | 3/2008 | Tamm | |
| 2010/0206631 A1 | 8/2010 | Peters | |
| 2010/0243320 A1 | 9/2010 | Bryant | |
| 2012/0148251 A1 | 6/2012 | Elberbaum | |

OTHER PUBLICATIONS

International Preliminary Report on Patentability dated Sep. 24, 2015.

\* cited by examiner

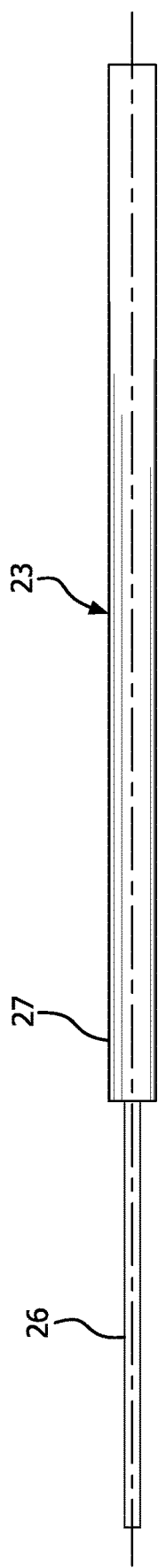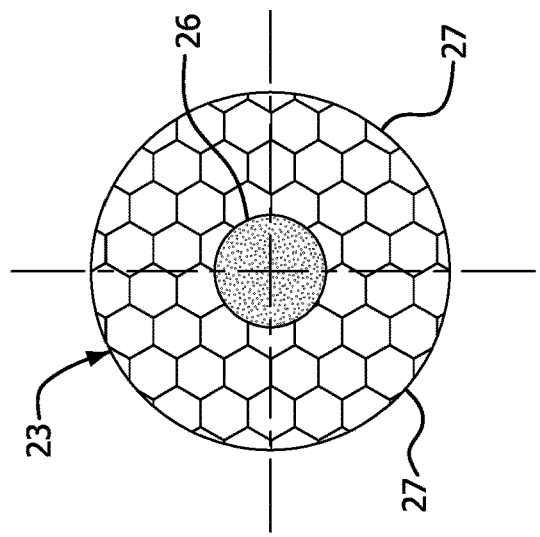

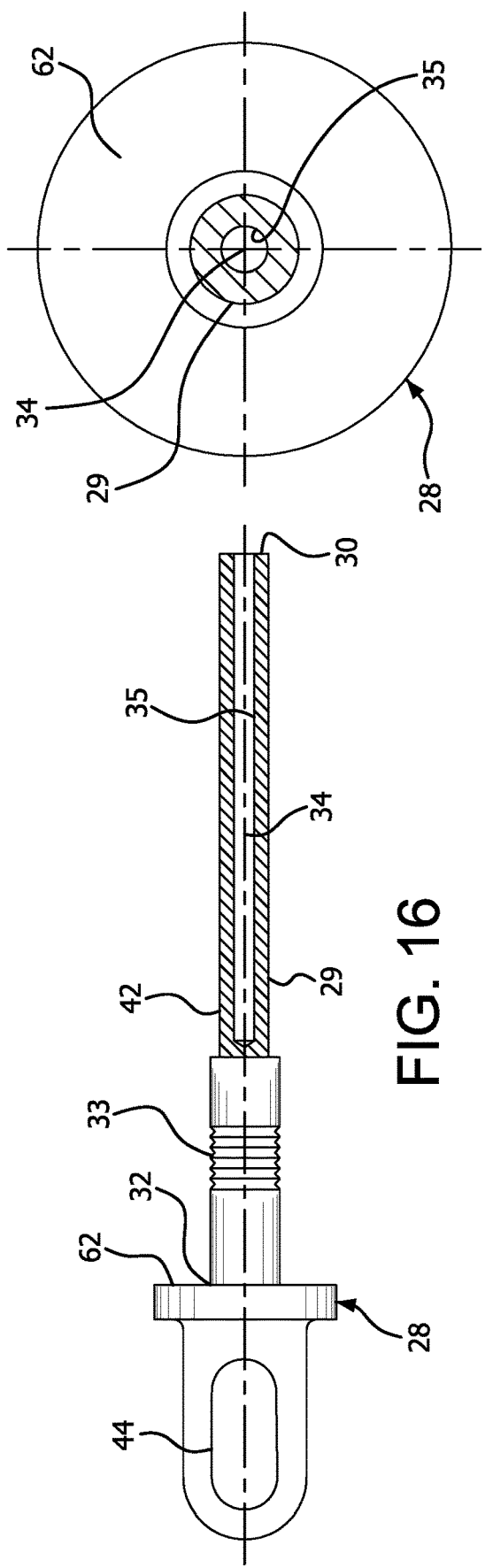
FIG. 16
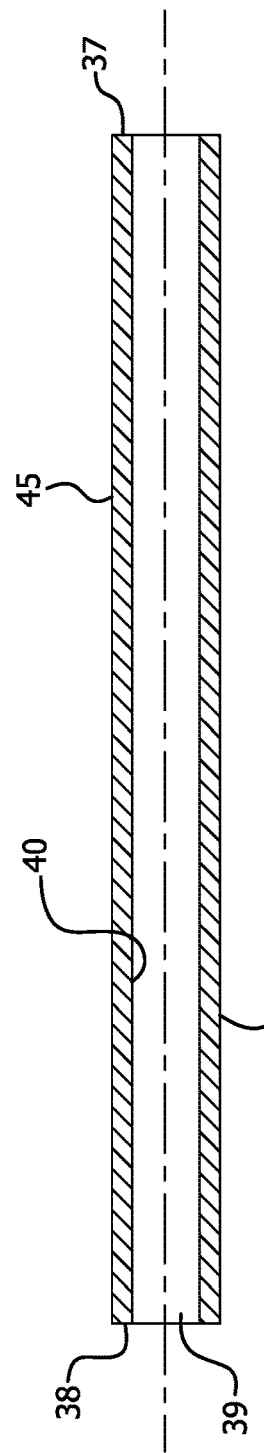
FIG. 17
FIG. 18

METHOD OF FORMING AN ELECTRICAL CONNECTOR

CROSS REFERENCE TO RELATED APPLICATION

This application is divisional application of Ser. No. 14/052,197 filed Oct. 11, 2013 which claims the benefit under 35 U.S.C. § 119(e) of U.S. Provisional Application Ser. No. 61/800,255, filed Mar. 15, 2013, which is hereby incorporated by reference in its entirety.

FIELD OF THE INVENTION

The present invention relates generally to electrically connecting a composite core conductor. More particularly, the present invention relates to a crimp die for connecting a composite core of a conductor to an electrical connector. Still more particularly, the present invention relates to a method of connecting a composite core of a conductor to an electrical connector.

BACKGROUND OF THE INVENTION

The vast majority of high voltage transmission conductors used includes strands of high strength steel surrounded by multiple strands of aluminum wire. The steel strands are the principle load bearing component holding up the wire, while the softer, more elastic aluminum strands include the majority of the electrical power transport component. Many variations of transmission wire operating at between approximately 115 kv to 800 kV involve this basic design concept and have these two basic components.

More recently, a composite core conductor having a fiberglass and epoxy resin core covered by aluminum wire has emerged as a substitute for the steel support stranding in high voltage transmission conductors. However, the outer surface of the composite core is difficult to mechanically connect to a compression tube of a connector member. The outer surface of the composite core is sensitive, such that a scratch on the outer surface can lead to a fracture of the composite core. Due to the sensitivity of the composite core, composite core conductors are not crimped and are usually connected with wedge connectors such as is disclosed in U.S. Pat. No. 7,858,882 to De France, which is hereby incorporated by reference in its entirety. Accordingly, a need exists for an electrical connector in which a composite core conductor is crimped thereto without damaging the outer surface of the composite core.

A conventional crimp die 2 is shown in FIGS. 1-3. A plurality of planar surfaces 3 form a crimp surface of the die 2. For example, the crimp surface of each conventional die 2 is comprised of three planar surfaces 3, as shown in FIG. 3. The planar surfaces 3 form a substantially hexagonal crimping area during the crimping process and result in a gap 4 between the dies 2 and a tubular portion 5 in which the composite core 26 is disposed, as shown in FIG. 2. The resulting gap 4 can detrimentally affect the outer surface of the composite core 26 as the crimp is not completely controlled. Additionally, the planar surfaces 3 provide a smaller area of compression 65 between the planar crimp surfaces 3 and the outer surface of the tubular portion 5 in which the composite core 26 is disposed. Furthermore, the planar surfaces 3 of the crimp die 2 apply compressive forces on tubular portion 5 at angles of 31 degrees from a horizontal axis 6 through a center of the core 26 and vertically at 90 degrees from the horizontal axis 6, as shown in FIG. 1. Three areas of compression are formed with each die 2. Accordingly, a need exists for a crimp die providing better crimp control of a composite core conductor.

SUMMARY OF THE INVENTION

An object of the present invention is to provide an improved electrical connector in which a composite core of a composite core conductor is crimped to the electrical connector.

Another object of the present invention is to provide an improved electrical connector member in which a composite core conductor is more easily and inexpensively crimped to an electrical connector.

Another object of the present invention is to provide an improved crimping die that crimps the composite core to an electrical connector without damaging an outer surface of the composite core.

Another object of the present invention is to provide an improved crimping die proving improved crimp control when crimping a composite core conductor.

The foregoing objectives are basically attained by an electrical connector including a coupling portion and a tubular portion extending from the coupling portion. A conductor has a non-metallic core surrounded by electrically conductive strands and has a connecting portion of the core extending axially beyond the strands. The connecting portion is received in the tubular portion. A crimped portion on the tubular portion radially engages the connecting portion and secures the conductor to the tubular portion. The crimped portion is formed by concave surfaces on internal surfaces of crimping dies. The concave surfaces have different radii of curvature than remaining portions of the internal surfaces The foregoing objectives are also basically attained by a method of crimping a conductor. A portion of electrically conductive strands surrounding a non-metallic core of the conductor is removed from the core. The exposed core of the conductor is inserted in a substantially tubular portion extending from a coupling portion of an electrical connector. The substantially tubular portion is crimped to the core to form a first crimped portion. The first crimped portion is formed by concave surfaces on internal surfaces of crimping dies. The concave surfaces have different radii of curvature than remaining portions of the internal surfaces.

Objects, advantages, and salient features of the invention will become apparent from the following detailed description, which, taken in conjunction with the annexed drawings, discloses an exemplary embodiment of the present invention.

As used in this application, the terms "front," "rear," "upper," "lower," "upwardly," "downwardly," and other orientational descriptors are intended to facilitate the description of the exemplary embodiments of the present invention, and are not intended to limit the structure thereof to any particular position or orientation.

BRIEF DESCRIPTION OF THE DRAWINGS

The above benefits and other advantages of the various embodiments of the present invention will be more apparent from the following detailed description of exemplary embodiments of the present invention and from the accompanying drawing figures, in which:

FIG. 14 is a side elevational view of a composite core conductor;

FIG. 15 is an end elevational view of the composite core conductor of FIG. 14;

FIG. 16 is a side elevational view partially in section of an eyebolt of the electrical connector of FIG. 12;

FIG. 17 is an end view of the eyebolt of FIG. 16; and

FIG. 18 is a side elevational view in cross-section of an outer sleeve of the electrical connector of FIG. 12;

Throughout the drawings, like reference numerals will be understood to refer to like parts, components and structures.

DETAILED DESCRIPTION OF EXEMPLARY EMBODIMENTS

Figure 10:
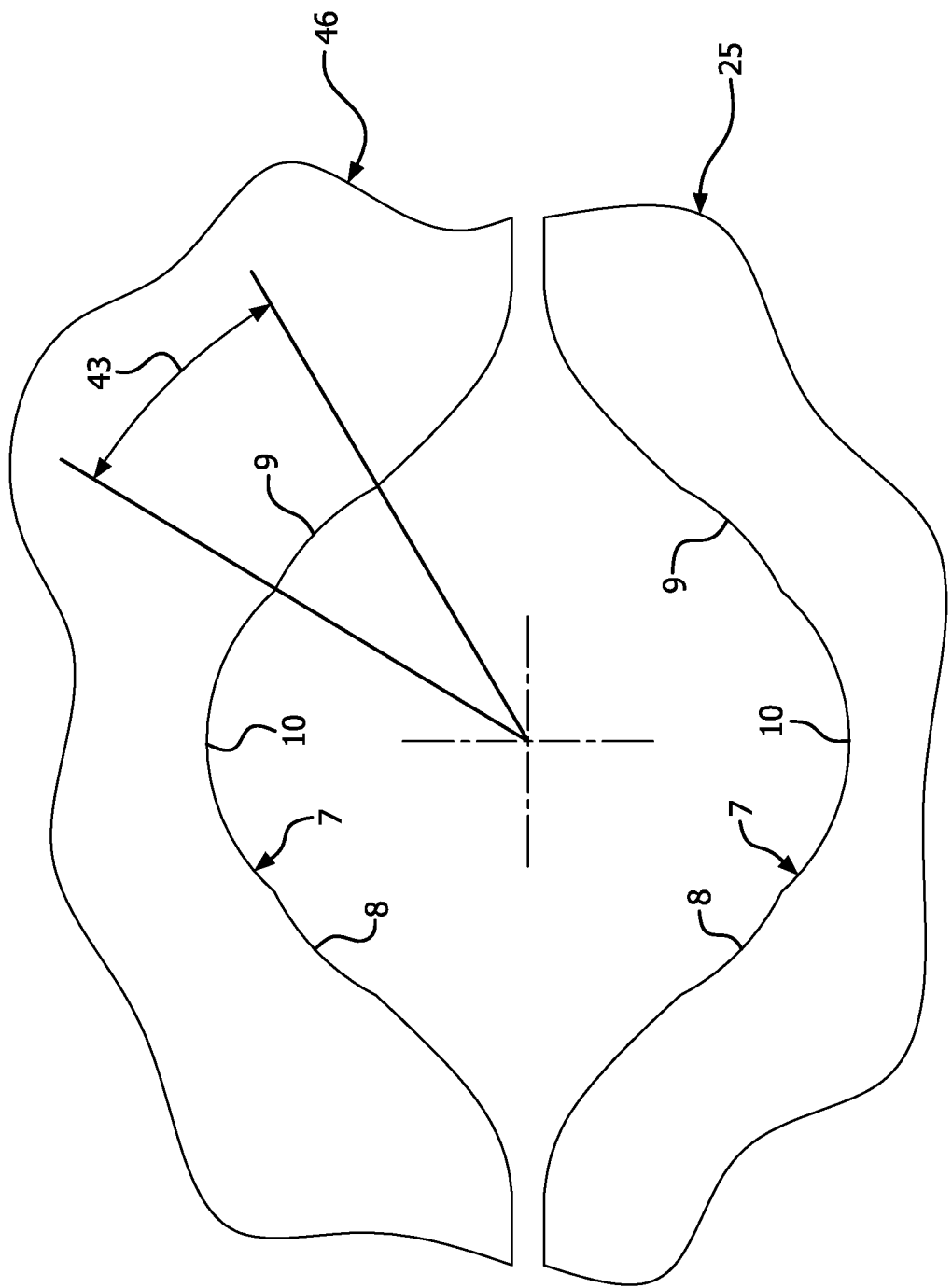
FIG. 10 is an enlarged end elevational view of the contact area of FIG. 9.
Figure 11:
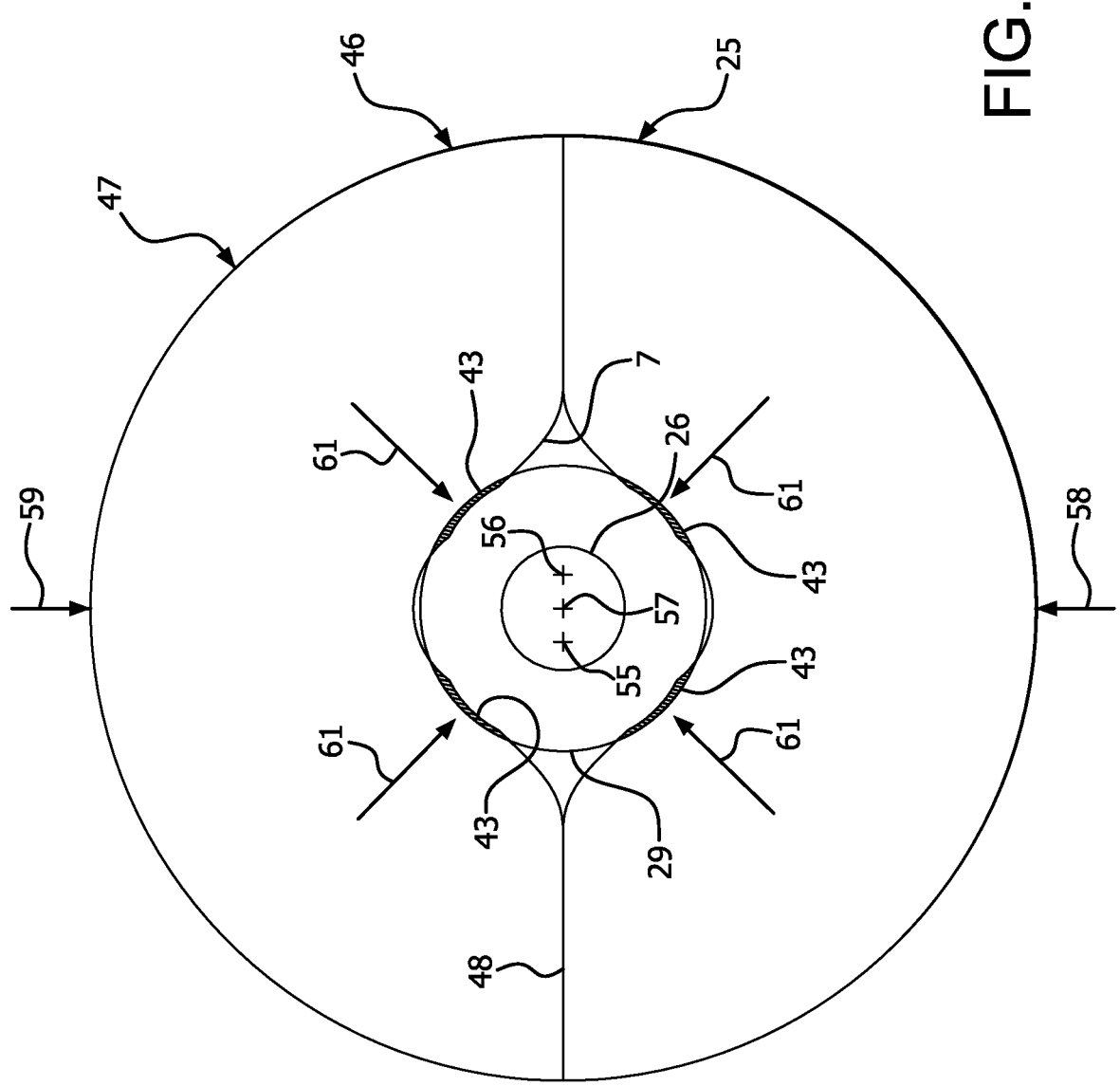
FIG. 11 is an end elevational view of the die of FIG. 4 with a composite core disposed therein.
Figure 12:
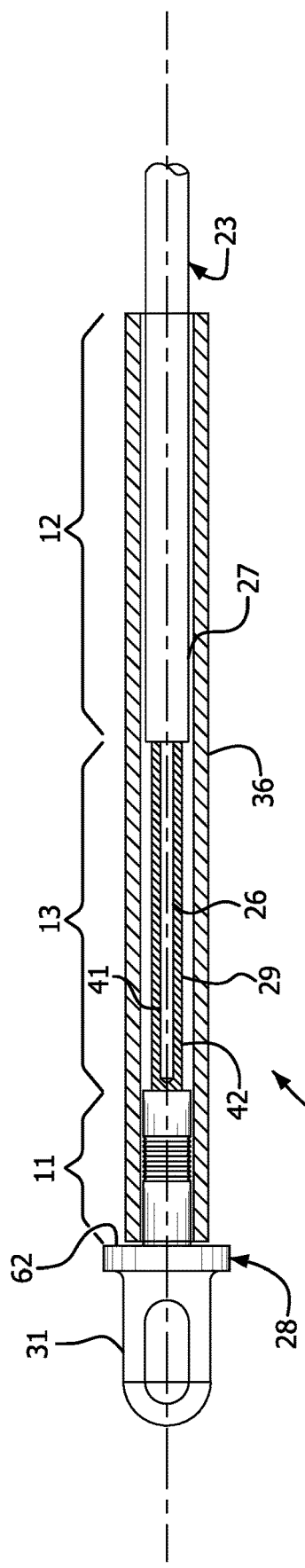
FIG. 12 is a side elevational view in partial cross-section of an assembled electrical connector in accordance with an exemplary embodiment of the present invention.

The present invention generally relates to an electrical connector 21 for receiving a composite core conductor 23, as shown in FIG. 12, and a crimp die 25, as shown in FIGS. 4-11, for crimping a composite core 26 of the composite core conductor 23 to the electrical connector 21. The electrical connector 21 reduces the number of components used in existing electrical connector assemblies, thereby reducing inventory and costs. The crimp dies 25 and 46 of the crimp die set 47 substantially prevent damage to an outer surface 41 of the composite core 26 during the crimping process.

The composite core conductor 23, as shown in FIGS. 14 and 15, includes a composite core 26 covered by a plurality of aluminum conductors 27. The composite core 23 is preferably made of a combination of fiber glass and epoxy resin. The plurality of aluminum conductors 27 are wrapped around the composite core 26. The composite core 26 reduces the weight of the composite core conductor 23 compared to traditional steel core conductors, such that more aluminum conductors can be used, thereby increasing electrical power capacity without increasing the outer diameter of the conductor. Additionally, the more lightweight composite core conductors 23 reduce sag associated with traditional steel core conductors.

The electrical connector 21 includes an eyebolt 28 having a substantially tubular portion 29 having an open first end 30 and an eyelet 31 connected to a second end 32, as shown in FIGS. 12, 16 and 17. An opening 44 in the eyelet 31 allows the electrical connector 21 to be connected to a support, such as a transmission tower. A ridge section 33 is disposed on an outer surface 42 of the tubular portion 29 between the first and second ends 30 and 32. A cavity 34 having an inner surface 35 extends inwardly from the first end 30 of the eyebolt 28. Preferably, the eyebolt 28 is unitarily formed as a single piece and is made of metal, such as steel or aluminum.

The tolerances of the tubular portion 29 are preferably extremely tight to more precisely control the inner and outer diameters thereof. The inner diameter preferably has a tolerance of 0.001 inches. The outer diameter preferably has a tolerance of 0.002 inches. By more precisely controlling the inner and outer diameters of the tubular portion 29, better control of the crimp between the tubular portion 29 and the core 26 of the composite core conductor 23 is achieved, thereby substantially preventing damage to the composite core during crimping.

An outer sleeve 36 is substantially tubular and has an outer surface 45 and first and second ends 37 and 38, as shown in FIGS. 12 and 18. A passageway 39 having an inner surface 40 extends from the first end 37 of the outer sleeve 36 to the second end 38, as shown in FIG. 18. Preferably, the diameter of the passageway 39 is substantially constant. Preferably, the outer sleeve 36 is unitarily formed as a single piece and is made of an electrically conductive metal, such as aluminum.

A crimp die 25 in accordance with an exemplary embodiment of the present invention is shown in FIGS. 6-11. First and second dies 25 and 46 form a die set 47 to crimp composite core conductors 23. Preferably, the first and second dies 25 and 46 are substantially identical.

Figure 6:
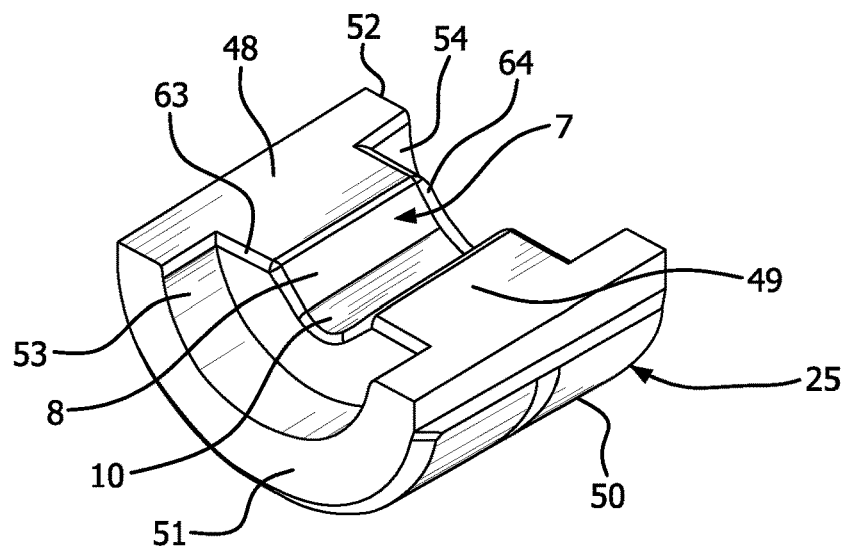
FIG. 6 is a perspective view of a die of FIG. 4.
Figure 7:
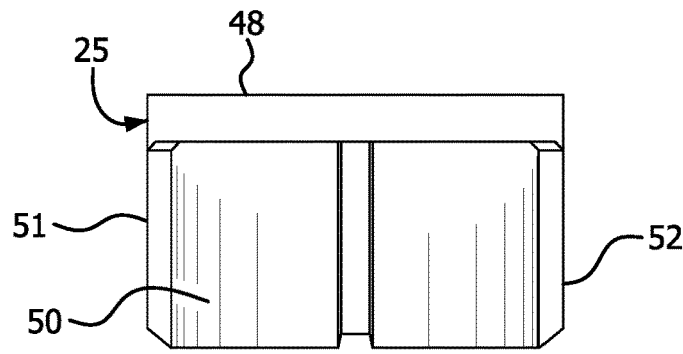
FIG. 7 is a side elevational view of the die of FIG. 6.
Figure 8:
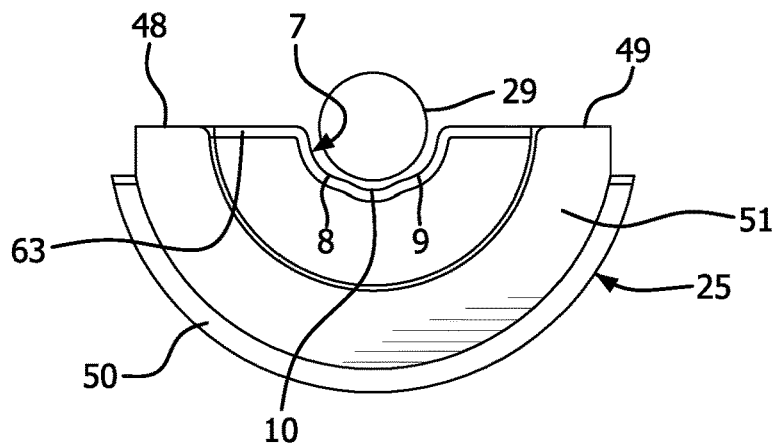
FIG. 8 is an end elevational view of the die of FIG. 7.

The crimp die 25 has a crimping area 7 including first and second crimping surfaces 8 and 9 and a non-crimping surface 10, as shown in FIGS. 6-11. The crimping area 7 extends between first and second substantially planar contact surfaces 48 and 49, as shown in FIGS. 6 and 8. An outer side surface 50 of the die 25 is adapted to be received by a crimping tool (not shown) and extends externally between the first and second substantially planar contact surfaces 48 and 49. Substantially planar front and rear surfaces 51 and 52 extend between the first and second planar contact surfaces 48 and 49 and are bounded by the outer side surface 50. Front and rear shoulders 53 and 54 are formed in the front and rear surfaces 51 and 52, as shown in FIGS. 6 and 8. Beveled surfaces 63 and 64 extend along upper edges of the front and rear surfaces 51 and 52 to accommodate flashing or protrusions during the crimping process.

The non-crimping surface 10 is disposed between the first and second crimping surfaces 8 and 9. The crimping surfaces 8 and 9 are concave. Center points 55 and 56 of the radii of the first and second crimping surfaces 8 and 9 are spaced from a center point 57 of the radius of the non-crimping surface 10, as shown in FIG. 10, such that the crimping surfaces 8 and 9 have a different radius than the radius of the non-crimping surface 10. Accordingly, the crimping surfaces 8 and 9 have a different radius of curvature than the non-crimping surface 10. Preferably, the radii of the first and second crimping surfaces 8 and 9 are longer than the radius of the non-crimping surface 10. As an example, the radius of the first and second crimping surfaces 8 and 9 is 0.36 inches and the radius of the non-crimping surface 10 is 0.25 inches.

Figure 4:
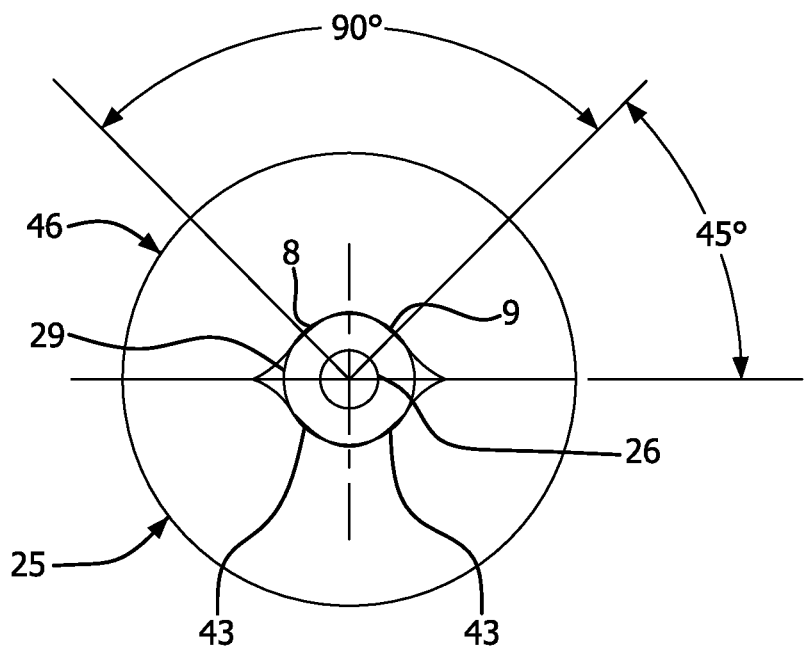
FIG. 4 is an end elevational view of a die crimping a composite core of a composite core conductor in accordance with an exemplary embodiment of the present invention.
Figure 9:
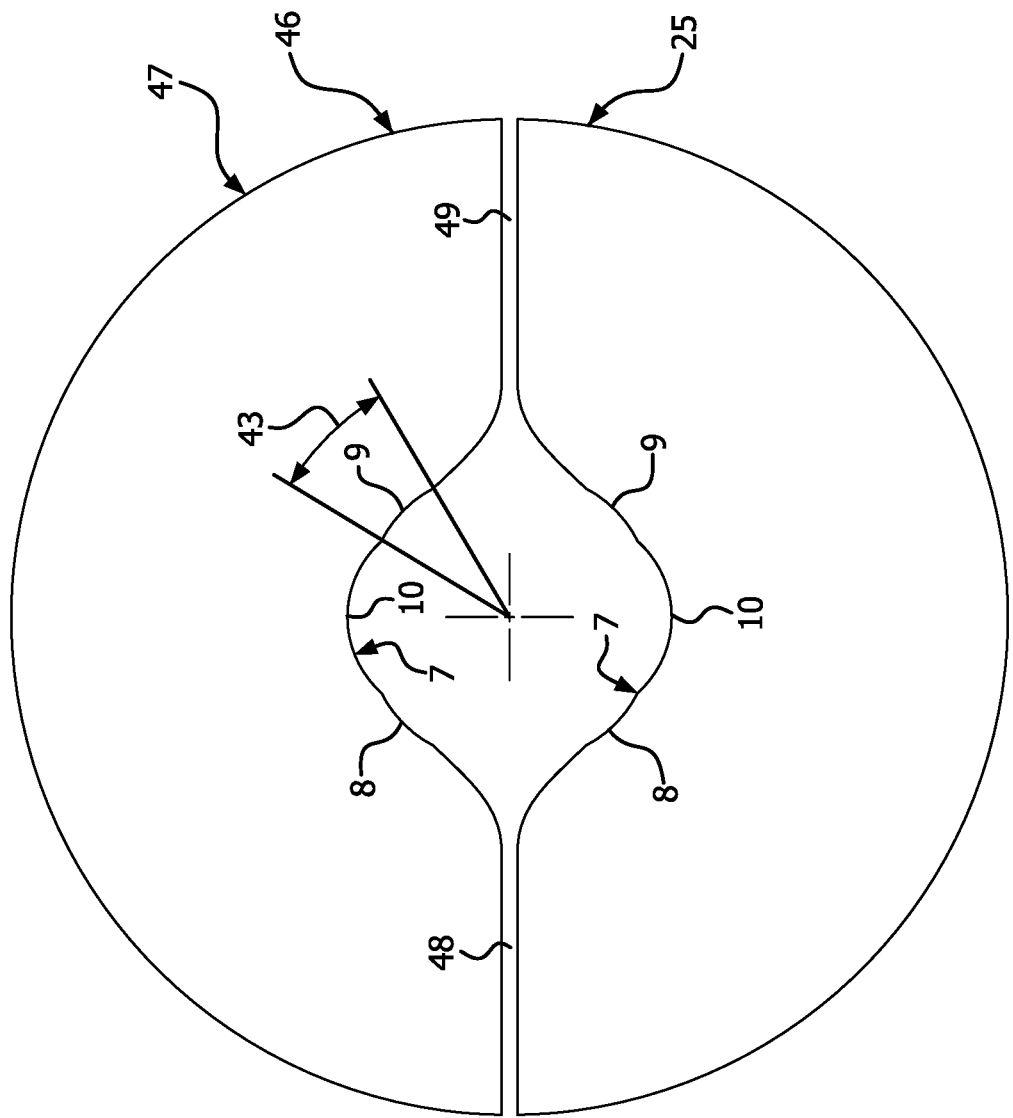
FIG. 9 is an end elevational view of the die of FIG. 4 showing a contact area of the die.

Preferably, the two concave crimping surfaces 8 and 9 are approximately 90 degrees apart on the crimping surface 7, as shown in FIG. 4. As shown in FIGS. 9-11, the concave crimping surfaces 8 increase the contact area 43 between the crimping surface 7 and the tubular portion 29. The crimps are applied approximately 180 degrees apart on the outer surface of the tubular portion 29 between diametrically opposite concave crimping surfaces 8 and 9 of opposing dies 25.

Figure 13:
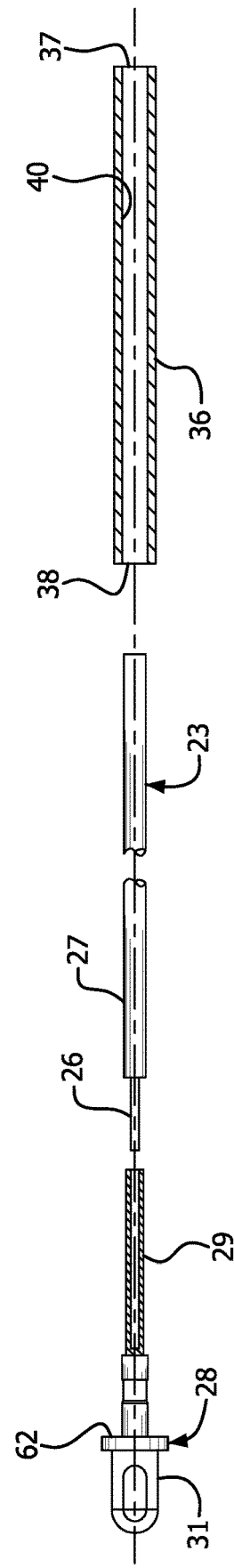
FIG. 13 is an exploded side elevational view of the electrical connector of FIG. 12 prior to assembly.

To assemble the electrical connector 21, a portion of the aluminum conductors 27 are removed from the conductor 23 to expose only the composite core 26, as shown in FIGS. 13 and 14. The exposed composite core 26 is inserted in the cavity 34 of the tubular portion 29 of the eyebolt 28, as shown in FIG. 12. The tubular portion 29 and the composite core 26 are then crimped together in a crimping area 13, as shown in FIG. 12.

Figure 5:
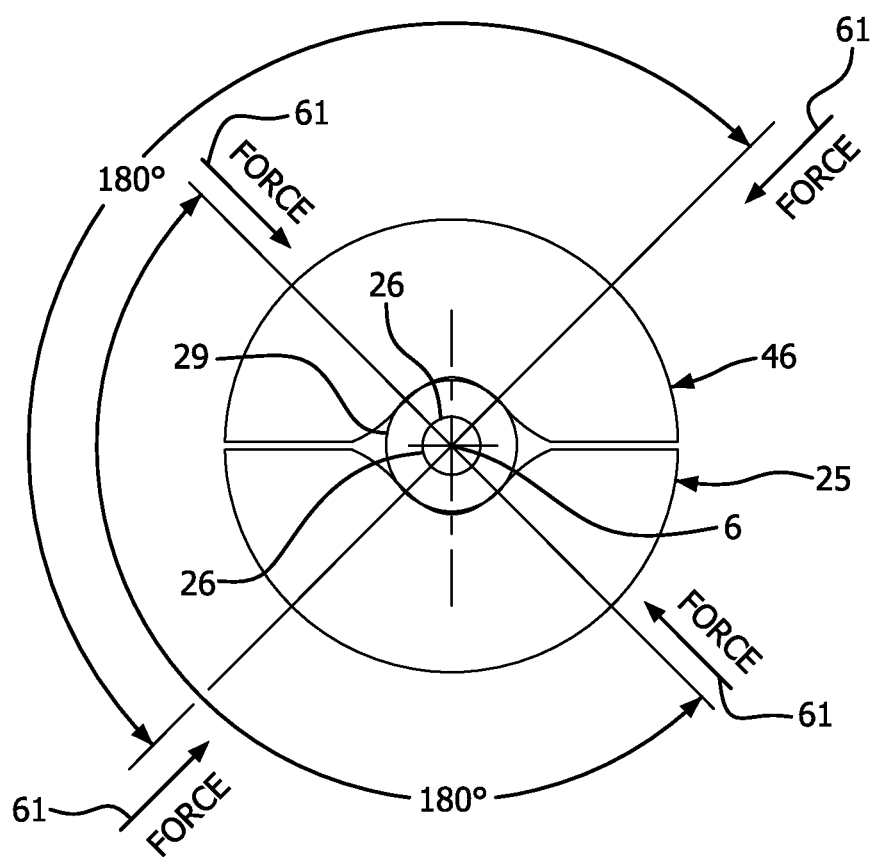
FIG. 5 is an end elevational view of the die of FIG. 4 prior to crimping.

The dies 25 and 46 of FIGS. 6-11 are used to crimp the tubular portion 29 to the composite core 26 to create a solid crimp connection without damaging the outer surface of the composite core 26. The crimp tool applies forces vertically on the crimp dies 25 and 46 as indicated by arrows 58 and 59 in FIG. 11. The crimping surfaces 8 and 9 are formed having two different radii such that the angle of compression is approximately 45 degrees, as shown in FIG. 4. Accordingly, applying forces 58 and 59 obliquely to the dies 25 and 46 results in crimping forces being applied at 45 degree angles due to the crimping surfaces 8 and 9 having a different radius than the non-crimping surface 10. As shown in FIG. 5, crimping forces are diametrically opposed such that the crimping forces are applied approximately 180 degrees apart. The concave crimping surfaces 8 and 9 having two different radii portions increases the contact area between the crimping surfaces 8 and 9 and the tubular portion 29 of the eyebolt 28, as shown in FIG. 11. Additionally, the compression dies 25 and 26 apply crimping forces that are diametrically opposed (approximately 180 degrees apart) relative to a longitudinal axis 6 of the composite core such that the composite core 26 is compressed to a substantially circular shape, as shown in FIGS. 4 and 5. The compression dies 25 also have very close tolerances. The applied compression forces in the conventional dies, shown in FIGS. 1 and 2, result in the core 26 being compressed to an oval shape that could detrimentally affect performance of the conductor.

Figure 1:
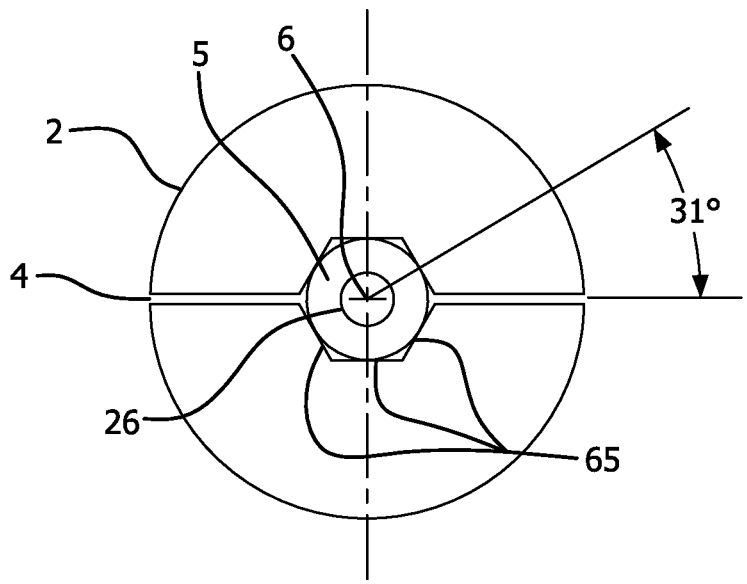
FIG. 1 is an end elevational view of a conventional die crimping a composite core of a composite core conductor.

Additionally, the tubular portion 29 has very close tolerances on the inner diameter and outer diameter thereof such that a proper amount of travel (or force) is applied during crimping. As shown in FIG. 4, close tolerances allow the contact surfaces 48 and 49 to engage during the crimping process, thereby ensuring a proper crimp is obtained. As shown in FIG. 1, a gap 4 remains between the opposing dies 2 during the crimping process such that the crimp is not accurately controlled during the crimping process, thereby resulting in under- and over-crimping. The crimp dies 25 and 46 substantially prevent over crimping that can damage the composite core 26 and substantially prevent under crimping that can have a detrimental effect on performance. Accordingly, a better crimp can be obtained that does not substantially damage the outer surface of the composite core 26.

Figure 2:
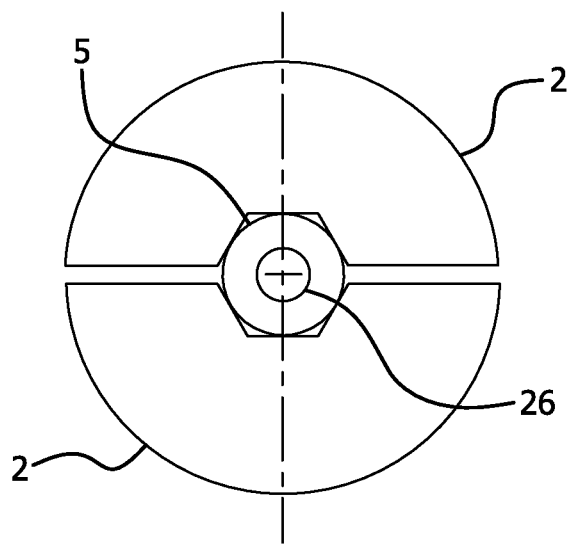
FIG. 2 is an end elevational view of the conventional die of FIG. 1 showing a gap between the dies prior to crimping.
Figure 3:
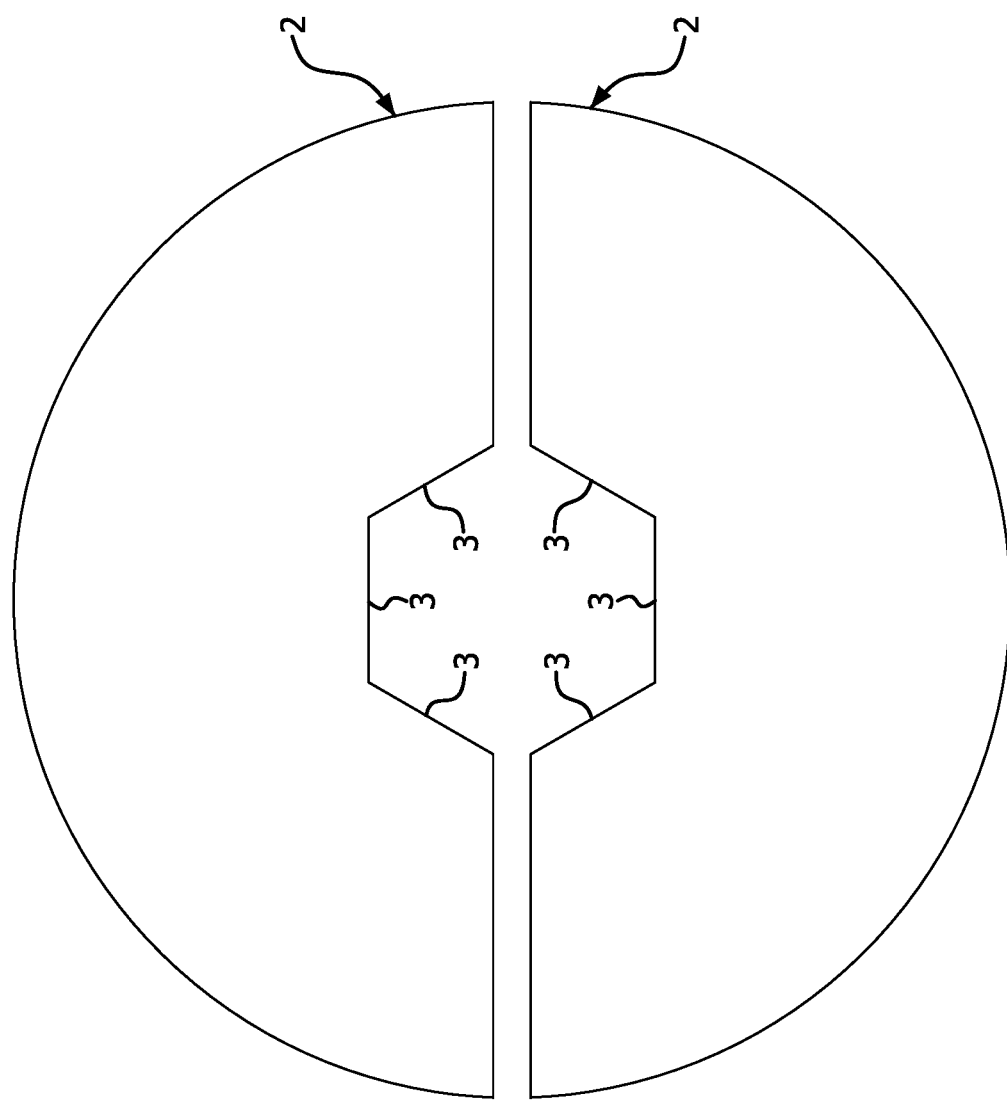
FIG. 3 is an end elevational view of a conventional die for crimping a composite core.

As shown in FIGS. 6 and 8, the crimping surfaces 8 and 9 of the crimp dies 25 and 46 are concave compared to the planar surfaces 3 of the conventional crimp dies 2 shown in FIGS. 1-3. The crimping surface of the conventional dies 2 is comprised of three planar surfaces 3, as shown in FIG. 3. The planar surfaces 3 result in a gap 4 between the crimp dies 2, as shown in FIG. 1. As shown in FIG. 3, there is no gap between the crimp dies 25 and 46 during the crimp process when the crimp dies 25 and 46 have fully traveled. Additionally, the planar surfaces 3 provide a smaller area of compression between the surfaces 3 and the composite core 26 and a smaller angle of compression (approximately 31 degrees, as shown in FIG. 1).

The concave crimping surfaces 8 and 9 in accordance with exemplary embodiments of the present invention as shown in FIGS. 6-11, provide a larger area of compression 60, as shown in FIG. 11, and a larger angle of compression (approximately 45 degrees). The dies 25 and 46 also increase the angle of compression to approximately 45 degrees from the 31 degree angle of compression shown in FIG. 1 for the conventional crimp dies 2.

The applied crimping forces 61 are diametrically opposed such that, in combination with the mating contact surfaces 48 and 49 substantially eliminating a gap between the dies 25 and 46 during the crimping process, that the composite core 26 is compressed to a substantially rounded shape. Accordingly, the crimp dies 25 and 46 substantially prevent crimps that damage or otherwise detrimentally affect the composite core 26. Accordingly, a better crimp can be obtained that does not substantially damage the outer surface of the composite core 26.

The crimping surfaces 8 and 9 provide a non-damaging indent on the inner surface 35 of the tubular portion 29 of the eyebolt, as shown in FIG. 16. A plurality of the crimps are performed on the outer surface 42 of the tubular portion 29 in a composite core crimping area (first crimping area) 13, which extends for substantially the length of the cavity 34 in the tubular portion 29, as shown in FIG. 12. When the composite core 26 has been crimped to the tubular portion 29, the outer sleeve 36 is disposed over the tubular portion 29, as shown in FIG. 12. A first end of the outer sleeve 36 abuts a flange 62 of the eyebolt 28 and a second end of the outer sleeve extends beyond the open end of the tubular portion 29 of the eyebolt 28.

The outer sleeve 36 is then crimped in second and third crimping areas 11 and 12, as shown in FIG. 12, thereby securing the conductor 23 to the electrical connector 21. The outer sleeve 36 is crimped to the eyebolt 28 in the second crimping area 11. The outer sleeve 36 is crimped to the conductor 23 in the third crimping area 12. Any suitable crimping dies can be used for the crimping process in the second and third crimping areas 11 and 12. The outer sleeve 36 is not crimped in the first crimping area 13 in which the tubular portion 29 of the eyebolt 28 is crimped to the composite core 26. The eye bolt 28 can be anchored to any type of structure. The structure may include, but is not limited to, a pole, a building, a tower, or a substation.

The foregoing embodiments and advantages are merely exemplary and are not to be construed as limiting the scope of the present invention. The description of the exemplary embodiments of the present invention is intended to be illustrative, and not to limit the scope of the present invention. Various modifications, alternatives and variations will be apparent to those of ordinary skill in the art, and are intended to fall within the scope of the invention as defined in the appended claims and their equivalents.

What is claimed is:

1. A method of forming an electrical connector comprising the steps of:
    inserting a non-metallic core of an electrical conductor into a substantially tubular portion of an electrical connector; and
    crimping said tubular portion by a die Set including a first crimping die and a second opposing crimping die to form a plurality of crimped portions on said tubular portion and non-crimped portions, where each crimped portion on said tubular portion has a concave configuration relative to said non-crimped portion of said tubular portion and a convex surface area, said first crimping die and said second crimping die having a crimping area with a first concave crimping surface, a second concave crimping surface, and a non-crimping area between said first crimping surface and second crimping surface, wherein said crimping step forms said tubular portion with a substantially circular cross section on said non-metallic core.

2. The method of claim 1, wherein said non-crimping area of said first crimping die and said second crimping die has a concave non-crimping surface, and wherein said crimping area extends between substantially planar contact surfaces of said first crimping die and said second crimping die.

3. The method of claim 2, wherein said first and second concave crimping surfaces of said crimping dies have a radius of curvature greater than a radius of curvature of said concave non-crimping surface, said crimping surfaces forming said crimped portions with a radius of curvature greater than a non-crimped portion of said tubular portion.

4. The method of claim 1, wherein said first crimping surface of said first die is oriented 180 degrees from the second crimping surface of said second die, and said second crimping surface of said first die is oriented 180 degrees from said first crimping surface of said second die.

5. The method of claim 1, wherein said plurality of crimped portions on said tubular portion extend substantially a length of said tubular portion and said tubular portion is crimped directly on said non-metallic core.

6. The method of claim 1, wherein said crimping forms a plurality of crimped portions oriented 180 degrees apart from an opposing crimped portion with respect to a longitudinal axis of said non-metallic core.

7. The method according to claim 1, wherein
said convex surface area of said concave configuration of each of said plurality of crimped portions have a radius of curvature greater than a radius of curvature of a non-crimped surface formed by said non-crimping area of said first crimping die and said second crimping die.

8. The method according to claim 1, further comprising abutting contact surfaces of the first crimping die and second crimping die to control a travel distance of the crimping dies when crimping the plurality of crimped portions.

9. The method according to claim 8, wherein
an inner diameter of the tubular portion has a tolerance of 0.001 inches and an outer diameter of the tubular portion has a tolerance of 0.002 inches to facilitate controlling the travel distance of the crimping dies when crimping the plurality of crimped portions.

10. The method according to claim 1, further comprising the step of positioning an outer sleeve on the tubular portion, and crimping the outer sleeve to a coupling portion of the electrical connector to form a second crimped portion.

11. The method according to claim 10, wherein the outer sleeve has a length extending beyond the tubular portion and over the conductor, said method further comprising crimping the outer sleeve to the conductor to form a third crimped portion.

12. The method according to claim 1, wherein said tubular portion has un-crimped portions with a convex surface area between said crimped portions.

13. The method according to claim 1, further comprising the step of
applying crimping forces to the tubular portion with the concave crimping surfaces of the first crimping die and second crimping die at angles of approximately 45 degrees relative to a direction of force applied to said crimping dies.

14. A method of forming an electrical conductor, comprising:
crimping a tubular portion onto a non-metallic core of an electrical conductor to form a first crimped portion, a second crimped portion, and a non-crimped portion between said first crimped portion and said second crimped portion, the first crimped portion and the second crimped portion being formed by a die set including a first crimping die and a second crimping die, each said crimping dies having a crimping area with a first concave crimping surface area, a second concave crimping surface area, and a concave non-crimping surface area between said first crimping surface area and said second crimping surface area, the first and second concave crimping surface areas having a different radius of curvature than a radius of curvature of said concave non-crimping surface, said crimping step forming said first crimped portion, said second crimped portion, and said non-crimped portion to form a crimped tubular portion having a substantially circular cross section.

15. The method conductor according to claim 14, wherein the radius of curvature of the first concave surface and the second concave surface area is greater than a radius of curvature of the concave non-crimping surface area.

16. The method according to claim 14, further comprising applying crimping forces to the tubular portion of the electrical conductor with the first and second concave surfaces of the crimping dies at angles of approximately 45 degrees relative to a direction of force applied by said crimping dies.

17. The method according to claim 14, further comprising positioning an outer sleeve on the tubular portion of the electrical conductor and crimping the outer sleeve to a coupling portion of the electrical connector to form a second crimped portion on said outer sleeve.

18. The method according to claim 17, further comprising crimping the outer sleeve to the conductor to form a third crimped portion.

19. The method of claim 14, wherein said crimping step forms said first crimped portion with a convex outer surface, and said second crimped portion with a convex outer surface.

20. The method of claim 19, wherein said convex surface area of said first crimped portion and second crimped portion have a radius of curvature greater than the radius of curvature of the non-crimped portion.

21. The method of claim 20, wherein said crimped tubular portion has non-crimped portions between adjacent crimped portions, said non-crimped portions having a convex surface area.

* * * * *